US010620866B1

(12) United States Patent
Kumar et al.

(10) Patent No.: US 10,620,866 B1
(45) Date of Patent: Apr. 14, 2020

(54) REPRESENTATION-BASED PARTITIONING OF DISTRIBUTED COMPUTING ENVIRONMENTS

(71) Applicant: Amazon Technologies, Inc., Seattle, WA (US)

(72) Inventors: Sandeep Kumar, Sammamish, WA (US); Anirudha Singh Bhadoriya, Seattle, WA (US); Ankit Singh, Seattle, WA (US); Varun Verma, Newcastle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 231 days.

(21) Appl. No.: 15/902,840

(22) Filed: Feb. 22, 2018

(51) Int. Cl.
*G06F 12/00* (2006.01)
*G06F 3/06* (2006.01)
*G06F 16/11* (2019.01)
*G06F 16/13* (2019.01)
*G06F 16/28* (2019.01)
*G06F 16/901* (2019.01)

(52) U.S. Cl.
CPC ............ *G06F 3/0644* (2013.01); *G06F 3/064* (2013.01); *G06F 3/0647* (2013.01); *G06F 16/128* (2019.01); *G06F 16/137* (2019.01); *G06F 16/288* (2019.01); *G06F 16/9024* (2019.01)

(58) Field of Classification Search
None
See application file for complete search history.

(56) References Cited

U.S. PATENT DOCUMENTS

2015/0154262 A1* 6/2015 Yang .................... G06F 11/1451
707/649
2018/0189145 A1* 7/2018 Borate ................ G06F 11/1451

* cited by examiner

*Primary Examiner* — Jason W Blust
(74) *Attorney, Agent, or Firm* — Davis Wright Tremaine LLP

(57) ABSTRACT

A system partitions a graph representation of relationships between block devices and associated snapshots into a plurality of cells to more evenly distribute computing resource usage attributable to the block devices and snapshots. The relationships may be analyzed to determine resource usage associated with the block devices and/or the snapshots wherein the resource usage corresponds to a mutation operation rate or number of mutation operations performed (or scheduled for performance). As a result of determining that the resource usage for a given cell exceeds a predetermined threshold for resource usage, the cell may be partitioned into a plurality of cells, and a portion of the corresponding block device(s), and subsequent snapshot(s) generated therefrom, may be assigned to the new cell.

20 Claims, 10 Drawing Sheets

US 10,620,866 B1

REPRESENTATION-BASED PARTITIONING OF DISTRIBUTED COMPUTING ENVIRONMENTS

BACKGROUND

Many entities seeking to reduce the expense and overhead associated with maintaining their own computing resources, such as data storage and computing capacity, have turned to solutions offered by cloud-based computing resource service providers. Such distributed computing systems may provide customers with the ability to generate virtual devices, such as block storage devices, as well as the ability to manipulate incremental backups and state snapshots thereof. Such snapshots may, in some implementations, also become the basis of one or more new block storage devices, which in turn may also have snapshots generated therefrom. As the number of snapshots and volumes generated in the distributed computing system grows larger, the computing resources required to service related activity may also become quite large, and in some cases, unevenly distributed (relative to the activity and/or costs associated with a given snapshot or volume) across the resources of the computing resource service provider.

BRIEF DESCRIPTION OF THE DRAWINGS

Various techniques will be described with reference to the drawings, in which.

DETAILED DESCRIPTION

Figure 1:
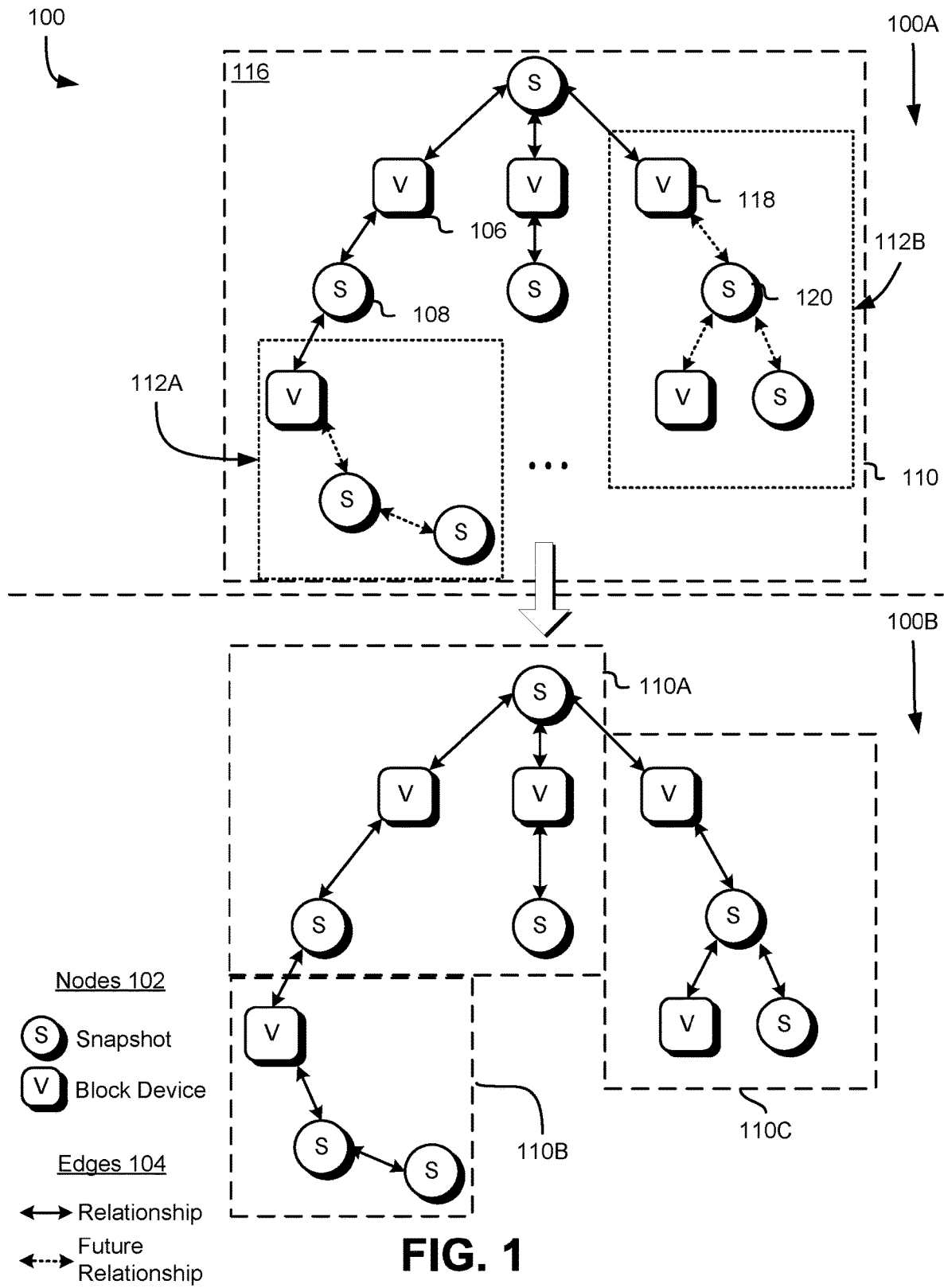
FIG. 1 illustrates a diagram in which a graph representation of interrelated data structures (e.g., representing resources of a computing resource service provider) is updated, according to one or more embodiments.

Techniques described and suggested herein include partitioning a graph representation of relationships between data structures representing resources of a computing resource service provider. Relationships between data structures, such as logical and/or physical block devices (also referred to herein as "volumes") and associated snapshots, are represented in a graph, which is in an embodiment a cyclic graph, as the data structures may have a many-to-many relationship as between each other. The graph is initially conceptualized as a single cell, which, according to techniques described herein, is further partitioned into a plurality of cells to more evenly distribute computing resource usage attributable to data structures, e.g., the block devices and snapshots. In one example, a set of block devices and corresponding snapshots of the block devices are provisioned on behalf of a user or group of users of a computing resource service provider. The set of block devices may store arbitrary data content of the user in block device data storage. A representation management service may generate a graph representation indicating various relationships between the block devices and snapshots. The various relationships may be analyzed to determine resource usage associated with the block devices and/or the snapshots wherein the resource usage corresponds to a mutation operation rate or number of mutation operations performed (or scheduled for performance). As a result of determining that the resource usage exceeds a predetermined threshold for resource usage, the representation management service may partition a cell of the representation that is responsible for the high resource usage. For instance, a cell containing a block device or snapshot having a high resource usage associated therewith may be partitioned into a plurality of cells, and the corresponding block device, and future snapshots related to the block device, may be assigned to a new cell.

Each cell may be associated with (e.g., serviced by) a corresponding set of one or more hosts, whether physical hosts and/or logical abstractions thereof, that perform various data storage operations for the cell, such as transferring data 'chunks' from a different data storage location to the set of hosts, generating snapshots, and the like. Moreover, a set of hosts for one cell may be disjoint from a set of hosts for another cell. Some of the hosts, for instance, may be located in a different server rack or datacenter than other physical hosts. As another example, the set of hosts may be logical (e.g., virtual) in nature, as virtual machine instances abstracted from a set of physical hosts using a hypervisor. Accordingly, partitioning a cell into a plurality of cells and reassigning block devices to another cell may reduce load on the set of physical devices associated with the cell. In some embodiments, the assessment of the mutation rate in a given cell is monitored over time, and to the extent the observed mutation rate reaches and/or exceeds a given threshold, one or more new cells may be generated to which to reallocate new volumes generated from snapshots in the source cell. Once reallocated, further snapshots of the reallocated volume are associated with the new cell, and the process optionally repeats.

Initiating capture of a snapshot of a block device assigned to a new cell may cause a service of the service provider to obtain data content from the block device of a previous cell. For instance, a snapshot service may obtain and store data content of the block device that has changed since capturing a previous snapshot. The changed data may be stored in a set of hosts for the new cell whereas the data content corresponding to the previous state may be maintained in a set of hosts for the initial cell. Retrieving a state of data content of a block device may include obtaining data content from a previous cell, but future snapshots based on the current state of the block states are associated with the current cell. Metadata of a snapshot may link to metadata of a previous snapshot indicating information regarding data content of the block device at a previous state. The metadata of the previous snapshot may be used to obtain the data content at the previous state, which may be combined with more recent data content to restore a current state of data content for the block device. Thus, cross-cell referencing is limited to initial snapshot generation, while further activity associated with the volume(s) associated with the new cell are generally contained within the new cell, thereby reducing processing overhead.

Partitioning a cell may include using a consistent hash algorithm to distribute data blocks and/or snapshots evenly among host collections. A hash table containing a plurality of hash value ranges may be established, and block devices and/or snapshots may be assigned to a corresponding cell based on a location of a hash value generated from identifiers of the block devices and/or snapshots in one of the hash value ranges.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates a diagram 100 in which a graph representation 116 of interrelated data structures (e.g., representing resources of a computing resource service provider) is updated, according to one or more embodiments. The representation 116 includes nodes 102 corresponding to data structures of the service provider and edges 104 corresponding to relationships between the data structures. The relationships may be many-to-many as between nodes 102, such as in the case where a block device 106 is associated with one or more snapshots and vice versa (e.g., 108). As such, the representation may be partly or entirely cyclic, such as in a cyclic graph (i.e., including at least one graph cycle). The representation 100 may correspond to data storage relationships in a system implementing and allocating block-level data storage and snapshots of block-level data storage. The representation 100 may be represented by any appropriate structure, such as a graph, a table, a matrix, a set of matrices, one or more systems of equations, a tree or set of trees, and/or a combination of such structures that show relationships of data structures in the system.

Data structures represented in the representation 100 correspond to one or more resources. Such resources include, in some embodiments, a set of volumes of block-level storage 106 (also referred to as a "block device") provided by a block-level data storage service, or other similar entity, of the service provider, and a set of snapshots 108 of data content stored in the set of block devices 102. In one embodiment, the block devices 106 may be provided to users of the service provider for use by one or more computer systems of the service provider. For example, the block devices 106 may be exposed to virtual computing instances of the service provider such that the instances may use the block devices 106 as local storage devices (e.g., physical disk drives). In one embodiment, a block device 106 may be a logical storage space within (or allocated by) a data storage system in which data objects may be stored in either structured or unstructured (raw) form. The block device 106 may be identified by a volume identifier. Data for the block device 106 may reside in one physical storage device (e.g., a hard disk) or span across multiple storage devices, which may reside on a different system than that of the allocated block device 106. Data contents of the block devices 106 may be modified by the service provider computer systems as a result of data storage operations performed thereon. The block device 106 may itself include several different types of data structures, and the block device may be entirely or only partially structured with such data structures. For example, the block device 106 may be variably manipulated, such as by a client device, to include several data structures in hierarchical form, such as partitions, logical volumes, file systems, directories, and files.

A "snapshot" may refer to a copy of a portion of a block device 106 taken at a particular point in time, or a copy of the entire block device 106 at a particular point in time. A snapshot may include, or have an association with, incremental data (which may also be referred to as a "change set") that includes data that is new or has changed since a previous snapshot was captured. The relationship between a current snapshot, $S_N$, and a previous snapshot, $S_P$, may be represented as $S_N=S_P+\Delta$, where $\Delta$ is a change in data content on the previous snapshot $S_P$—for example, data that is new or has changed in a block device 106 since a previous snapshot was captured. The previous snapshot $S_P$ may be an immediately preceding snapshot (i.e., $S_{N-1}$), or other previous snapshot generated reflecting a state of data content of a block device 106. Each of the snapshots 108 illustrated may be captured at a different point in time, as described below in further detail.

The edges 104 may correspond to data defining relationships between snapshots, relationships between block devices, and relationships between block devices and snapshots. Relationships between snapshots may correspond to either a full image of, or an incremental change in, data content of a block device 106, as described below. Relationships between snapshots 108 and block device 106 may correspond to snapshots 108 taken of a block device 106 at a given point in time, or a block device 106 generated from a snapshot 108. Additional relationships between data structures are described below in greater detail. Although the present description is related to storage systems involving block devices and snapshots, those of ordinary skill in the art will appreciate that the methods, systems, and processes described herein are applicable to other systems in which graph representation is appropriate to model relationships between incremental data structures.

A partitioning service of the service provider may partition the representation 116, including the data structures thereof, to optimize cost associated with modifying the relationships and migrating data associated with the data structures. The representation 116, which itself is an initial cell, may be partitioned into one or more cells 110A-C where a given data structure in the representation, such as a block device, is assigned to a new cell and any future data structures generated therefrom are associated with that new cell. The cells 110 correspond to a logical grouping of hosts distributed over a plurality of datacenters. As changes to the cell 110 are made over time, computing resource usage may increase in association with modifications to relationships in the representation 116. For instance, mutation operations (e.g., data storage operations) may be performed to fulfill creation of new snapshots 108 or modifications to existing snapshots 108 initiated to back-up state changes in data content of the block devices 106. These mutation operations, as described below, may have a high cost in terms of computing resources. To optimize resource utilization, the partition service may partition the cell 116 into a set of cells 110A-110C wherein the overall logical representation of the existing data structures remains the same, even after new cells are generated. For instance, the partitioning service may shard the cell 110 by distributing the data contents among a set of physical hosts located in one or more datacenter locations.

The partitioning of the cell 116 may be performed such that "hot" areas 112A-B of the cell (e.g., data structures having a concentration, or expected concentration based on one or more parameters attributable to the data structure or a related, e.g., predecessor, data structure, of associated mutating operations) are moved into a different cell. As described herein, "hotness" may refer to an observed or predicted concentration of mutation operations, such as capture of a new snapshot or incremental snapshot and/or the generation of a new volume/block device therefrom, associated with a data structure or set of data structures. As may be contemplated, different types of mutation operations may be associated with different amounts of computing resources for performing such operations (e.g., "cost"), and as such, may contribute differently to the overall hotness level. Partitioning may include allocating a new cell separate from the existing cell, associating one or more data structures in the "hot" area of the existing cell with the new cell, and directing the system to assign, to the new cell(s) future data structures related to (e.g., generated from) the rellocated data structures. For instance, in an initial state 100A of the representation 116, the partitioning service may detect one or more hot areas 112A-B of the representation 100 corresponding to one or more of block device(s) (e.g., 118, in the case of hot area 112B). Accordingly, the partition service may, for one or more of the hot areas 112, allocate one or more new cells; in this instance, cells 110B-110C. The partition service may then migrate and/or reallocate the block device(s), e.g., 118, in the existing cell 116 to the new cells 110B-110C, resulting in a second state 100B of the representation 100. The relationships between data structures represented in the first state 100A are maintained in the second state 100B such that a record is maintained for which data structures in the cell 100A correspond to which data structures in the new cells 110B-C. Future relationships, such as new snapshot(s) 120, are associated with the respective new cell(s) 110B-C. In some embodiments, the process may repeat with respect to the new cells 110B-C, as well as what remains of the initial cell 110A.

Figure 2:
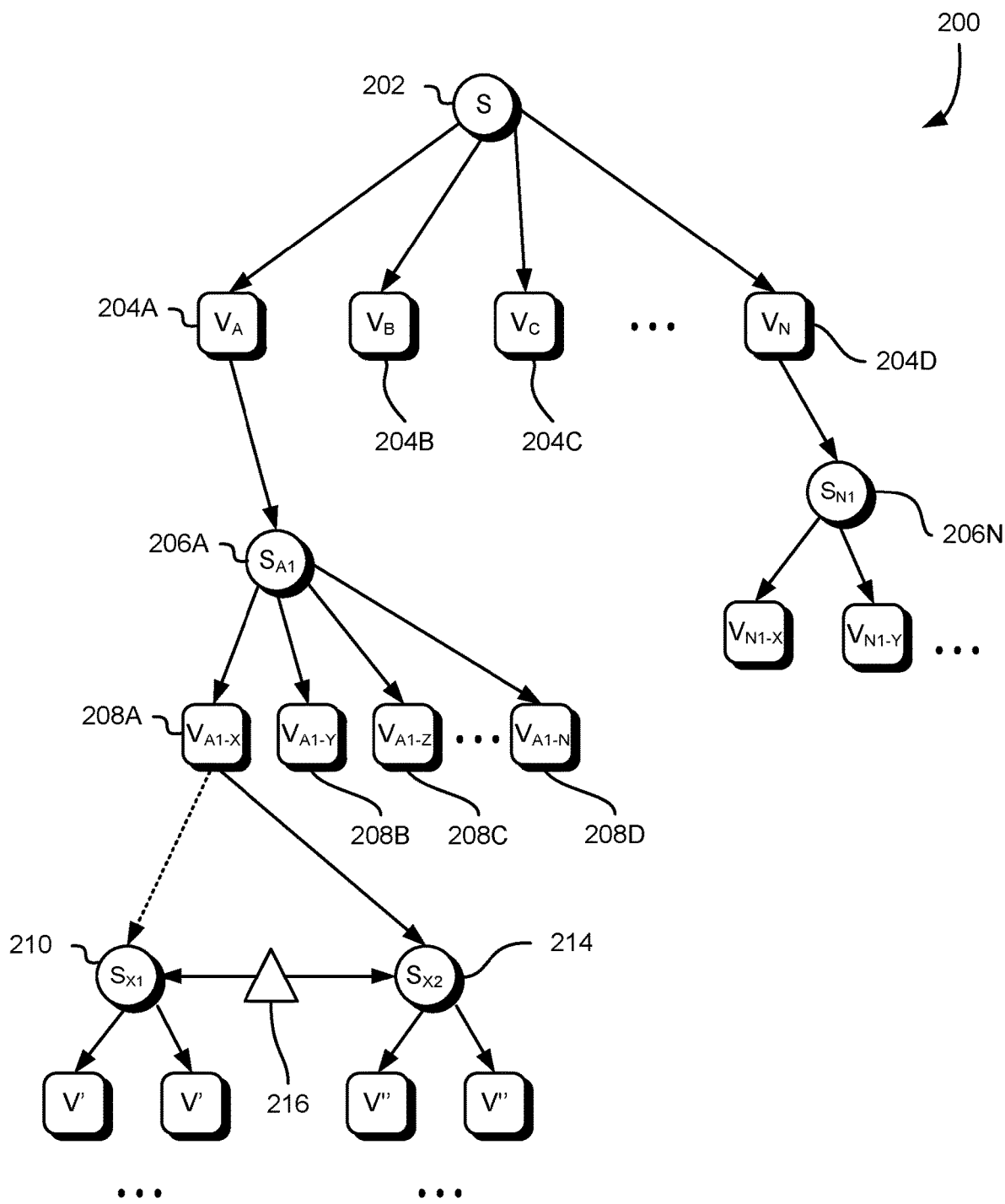
FIG. 2 illustrates a diagram of example relationships between data structures of a computing resource service provider, according to one or more embodiments.

FIG. 2 illustrates a diagram of example relationships between data structures of a computing resource service provider, according to one or more embodiments. The representation 200 includes a root node 202 from which the other data structures of the representation are generated. The root node in this example is a root snapshot 202 reflecting a state of data content stored in data storage, such as a block device hosted by the service provider or a volume of data provided by a user of the service provider. In one embodiment, the root node of the representation 200 may be a block device or other volume of data from which a snapshot may be generated. In the representation 200, a set of block devices 204 may be generated from the snapshot 202 corresponding to the root node. The set of block devices 204 may have data content identical to data content of a volume of data used to generate the snapshot 202.

The data content of the block devices 204 may change over time as data operations are performed thereon. For instance, a computer system instance (e.g., a virtual machine instance) may use the first block device 204A as if it is local data storage, such as by reading, modifying, and storing data content thereon. Accordingly, the first block device 204A may include data content different from the state of data content corresponding to the root snapshot 202. Similarly, data content of the other block devices 204B-204B may be different from the state of the data content corresponding to the root snapshot 202 as a result of having data operations performed thereon, and each block device 204 may have different data content than the other block devices 204. One or more snapshots 206 may be generated respectively reflecting data content of corresponding block devices 204 at a point in time. For instance, a first snapshot 206A may be generated reflecting data content of the first block device 204A at a point in time, and an Nth snapshot 206N may be generated reflecting a state of content of another block device 204N at a different point in time. Because data operations performed on the first block device 204A may be different or include different data content than the Nth block device 204N (e.g., by virtue of being used by different computer systems performing different operations), the data stored by a snapshot service in data storage in association with the first snapshot 206A may be different than the data stored for the Nth snapshot 206N. In some embodiments, the first snapshot 206A of a given volume 204A is a "full" snapshot of the volume 204A at the point in time at which it is taken, and not an incremental (delta) snapshot relative to the previous snapshot 202 associated with the volume 204A. However, in some embodiments, the first snapshot 206A of the block device 204A may be incremental relative to the source snapshot 202.

The number of relationships may grow in size and complexity as this process of generating snapshots and block devices is repeated. For instance, a second set of block devices 208 may be generated, each initially having identical data content, from the first snapshot 206A, a second snapshot 210 may be generated from one of the second set of block devices 208, and so on. It should be noted that snapshots generated at different points in time from the same block device may result in different snapshots. For instance, the snapshot 210 may correspond to a first state of data content of one of the second set of block devices 208A, and the snapshot 214 may correspond to a second, later state of data content of that same block device 208A. The snapshot 214 may be incremental in the sense that it includes less than the full data content of the block device 208A in the second later state. For example, the incremental snapshot 214 includes, rather than the full data content, only the data content 216 comprising the difference (delta) between the first and the second state. Accordingly, the incremental snapshot 214 may, for some operations such as new block device generation and/or further snapshot generation, rely upon data content corresponding to one or more previous states (e.g., snapshot 210, snapshot 206A, and/or snapshot 202). In some embodiments, there could be multiple of system states (as diagrammed in FIG. 2), each rooted on different snapshots. There is no upper limit to the number of relationships that may be created based on a single root node. Due to the complexity and size of the representations that may result from each root node, it may not be practical to maintain a representation rooted to a single common node. The features described herein provide efficient and effective methods, systems, and processes for partitioning representations into a plurality of representations in a way in which relationships between nodes of the representations are maintained.

Figure 3:
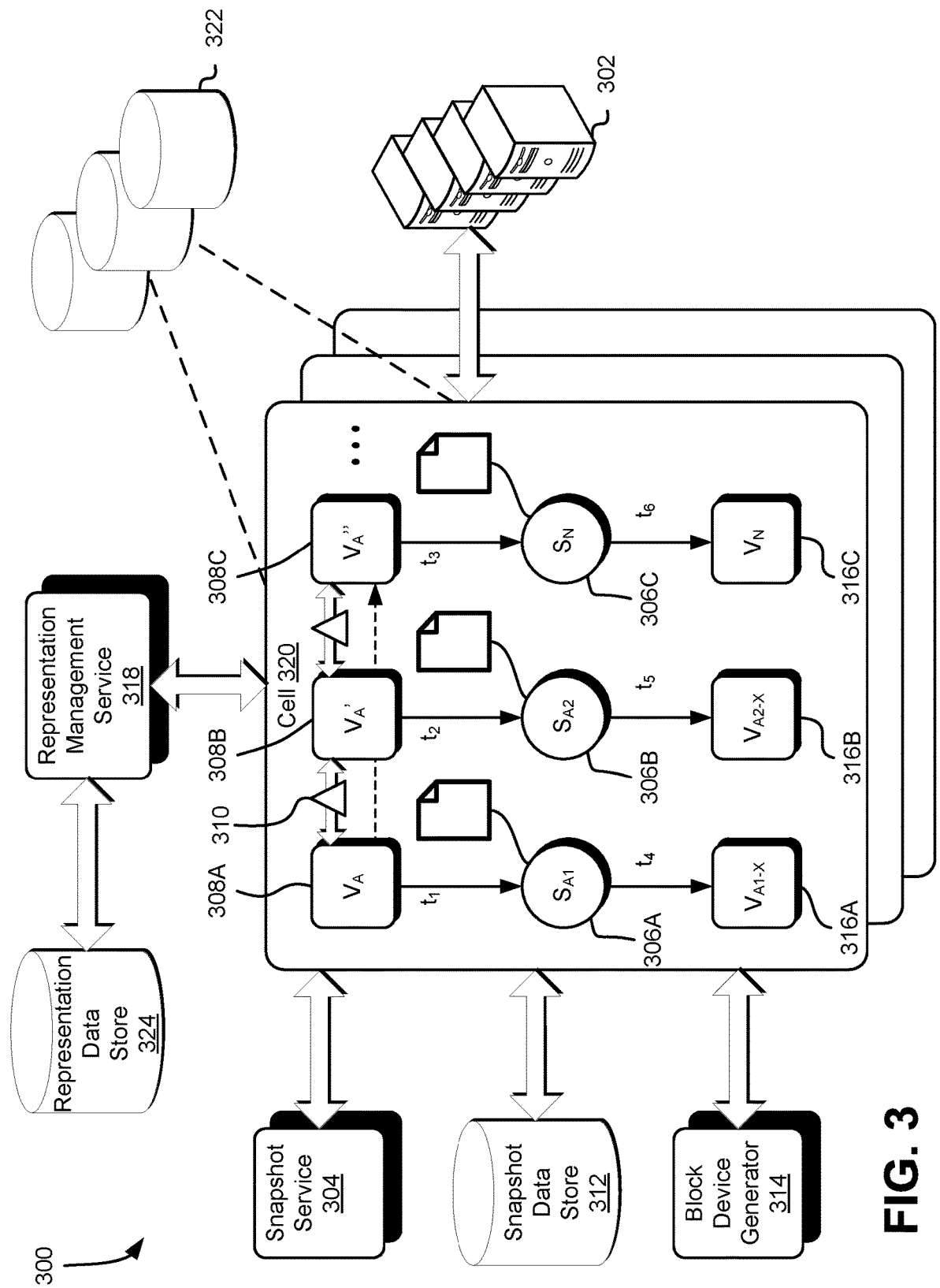
FIG. 3 illustrates an environment in which a representation management service analyzes resource usage associated with one or more cells that logically partition resources of the computing resource service provider, according to one or more embodiments.

FIG. 3 illustrates an environment in which a representation management service analyzes resource usage associated with one or more cells that logically partition resources of the computing resource service provider, according to one or more embodiments. One or more computer systems 302 of a computing resource service provider (which may be a distributed computing resource service provider) may be provided for connecting client devices (e.g., personal computers, servers, mobile devices) over a network. The computer systems 302 may, in response to receiving a request from a client device or other service of the service provider, mount (e.g., attach) one or more block devices provided by a block-level data storage service provided by the system or another entity of the computing resource service provider. For instance, the computer systems 302 may, as a result of receiving an application programming interface request including a block device identifier, cause a block device corresponding to the block device identifier to be mounted to the computer systems 302 and cause the block device to be available for data storage operations as if it was a local data store (e.g., physical drive). As mentioned, such block devices may be physical block devices, or logical block devices abstracted from underlying physical block devices.

A snapshot service 304 may take snapshots 306 of block devices 308 at different points in time. The snapshot service 304 may be a computer system, or abstraction thereof (such as a one or more virtual machines operating via a hypervisor), implemented using hardware and software, and may comprise one or more processors and memory that stores executable instructions whose execution by the one or more processors causes the computer system to perform operations described herein, including providing some or all of the functionality described as a service accessible to entities connecting to the implementing computing resource service provider. Each of the snapshots 306 illustrated may be captured at a different point in time: the first snapshot 306A capturing a state of data content 308A of a block device at a first time $t_1$, the second snapshot 306B capturing a state of data content 308B of a block device at a second time $t_2$, and the third snapshot 306C capturing a state of data content 308C of a block device at a third time $t_3$. The specific capture times may be determined based on a set schedule and/or at even intervals, on demand (and therefore potentially at irregular intervals) in response to a request to capture a snapshot, or based on detection of a predetermined condition, such as an amount of data changed in a block device 308. Each of the snapshots 306 may capture either only a differential portion of the block device 308 relative to the immediately previous snapshot, or, in some cases, more than just such a differential portion (e.g., may contain a differential portion relative to a snapshot further back than the one immediately preceding, or may contain a proportional portion and/or the differential portion, as previously described). For instance, the snapshot service 304 may determine a difference 310 between the state of data content 308A of the block device and the state of data content 308B of the block device, and store the difference 310 as the second snapshot 306B.

Data "chunks" associated with each snapshot may be stored in a different system or location, such as via a snapshot data content store, which may be a data storage service or archival data storage service provided by the computing resource service provider. To track the association between the snapshots and the data "chunks" they contain, the snapshot service 304 may track the snapshots 306 and the location of the associated data "chunks" in the snapshot data store 312, which may be one or more devices, whether physical or logically abstracted thereof, of the computer systems 302 or more generally implemented by a service or resource of the implementing computing resource service provider. The snapshot data store 312 may be a key-value store, a relational database, or other similar storage system capable of correlating an identified object (such as via a unique identifier, such as an identifier associated with each snapshot 306) and other data, such as location data for the associated data "chunk." Such commission of the association information in the snapshot data store may be either synchronous or asynchronous relative to the actual creation of the correlated snapshot 306. In one embodiment, the snapshot service 304 may, as a result of a snapshot 306 capture, cause "chunks" corresponding to the state of data content 308 of the block device to be transferred to the snapshot data store 312. In particular, as the amount of data content 308 may be too large to transfer as a single "chunk", the data content 308 may be transferred as a plurality of chunks over a period of time. This transfer process corresponds to a significant resource cost to the system, and may be a burden on computing resources associated with a particular cell, as discussed below.

A block device generator 314 may generate block devices 316 using data content stored in the snapshot data store 312 corresponding to one or more snapshots 306. For example, the block device generator 314 may receive a request to restore a block device, the request including identification information of the corresponding snapshot (e.g., snapshot identifier, identification information of a block device at a given point in time). The block device generator 314 may interface with a snapshot data store 312 to locate the specific "chunk" or "chunks" of data associated with a snapshot 306 corresponding to the identification information. The generator 314 retrieves the chunks from the location in the snapshot data store 312 at which they are stored and, depending on the specific data operations requested, places some or all of the retrieved data chunks in a memory cache. The retrieved data is presented as an addressable snapshot block device via a block device driver. In some embodiments, the snapshot associated with the requested block device may be associated with one or more other snapshots, such as predecessor snapshot(s). In cases where the source snapshot for the requested block device is, e.g., incremental (e.g., 306C/316C), the block device generation 314 may also, by interfacing with the snapshot data store 312, locate the data chunks for one or more predecessor snapshots (e.g., 306B, 306A) sufficient to restore, into the new block device 316C, the full state of the data in the block device from which the source snapshot derives.

The generator 314 may retrieve a model for the snapshot(s) 306 to determine one or more file systems associated with the snapshot 306, and in accordance, may configure the appropriate file system driver(s) and present the snapshot block device as a file system device. Depending on the requested data operation, the file system device and/or the snapshot block device may be provided directly to the requestor, or another entity (such as a file system analyzer) may interact via the emulated snapshot block device and/or the file system device to perform the data operations requested (e.g., retrieval of specific files, differential comparisons of portions of snapshots, generation of metadata of the captured snapshots, etc.). The block device generator 314 may be a computer system implemented using hardware and software, and may comprise one or more processors and memory that stores executable instructions whose execution by the one or more processors causes the computer system to perform operations described herein. For example, the block device generator 314 may be a block-level storage service implemented by a computing resource service provider, which processes block device provisioning, update, snapshotting, and other requests received via a programmatic interface implemented thereby, to perform the requested action(s).

A representation management service 318 may monitor operations performed by the computer systems 302, the snapshot service 304, and the block device generator 314 to generate, analyze, and maintain a representation corresponding to data structures (e.g., block devices, snapshots) and the relationships therebetween. The representation management service 318 and the representation data store 324 may be one or more computer systems, or abstraction thereof (such as a one or more virtual machines operating via a hypervisor), implemented using hardware and software, and may comprise one or more processors and memory that stores executable instructions whose execution by the one or more processors causes the computer system to perform operations described herein, including providing some or all of the functionality described as a service accessible to entities connecting to the implementing computing resource service provider. The representation management service 318 may coordinate with the computer systems 302, the snapshot service 304, and the block device generator 314, as well as other systems and services of the service provider, to track information corresponding to one or more representations of the data structures and relationships. The representation management service 318 may partition the data structures and relationships into a set of cells 320. A "cell", as used herein, may refer to a logical partition of data structures and relationships grouped together in a manner such that data content for the logical partition is assigned for storage in a set of hosts, which may be separate from one another (e.g., located in different datacenters, be separate physical hosts having separate data storage devices). In the environment 300, for instance, data content (e.g., "chunks") of snapshots 306A-306C may be stored in a set of hosts 322 assigned to the cell 320, wherein each of the set of hosts 322 are located in a different datacenter than the other hosts in the set of hosts 322.

Each cell 320 may include a root node corresponding to a particular data structure from which the remaining nodes in the cell originate, as discussed below in further detail. The representation management service 318 may maintain information for each cell 320, such as data block identifiers, snapshot identifiers, information indicating relationships between data structures, and partition information corresponding to each cell. The management service 318 may also track relationship information of relationships of data structures between cells 320, such as a relationship of a snapshot in one cell to a block device in another cell. The management service 318 may coordinate with the snapshot service 304, the computer systems 302, and the block device generator 314 to ensure that data operations associated with each cell 320 are performed on or using the appropriate corresponding data. The representation management service 318 may store data structure information and representation information of each cell, and relationship information between nodes of different cells, as representation information in a representation data store 324. The representation information may include information representing the cells 320 as representations or other equivalent structures, as discussed herein.

Figure 4:
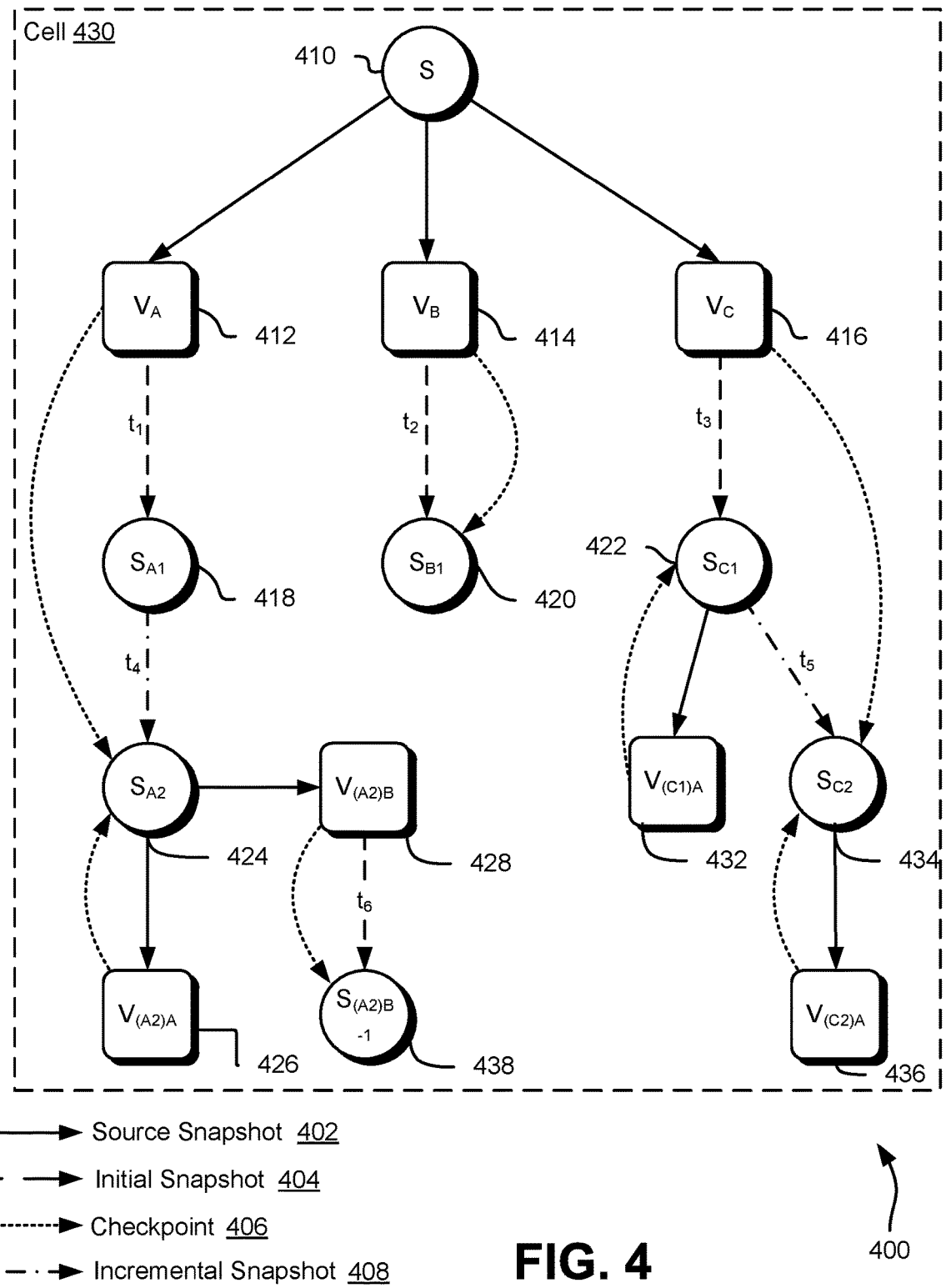
FIG. 4 illustrates a diagram of checkpoints and other relationships, over time, between data structures of the service provider, according to one or more embodiments.

FIG. 4 illustrates a diagram 400 of checkpoints and other relationships, over time, between data structures of the service provider, according to one or more embodiments. A cell 430 may be generated, and the various data structures associated therewith, by one or more appropriate entities described herein, such as a representation management service described above. The cell 430 contains data structures of the service provider, and FIG. 4 indicates various states of data structures assigned to and maintained within the cell 430 over time. As previously mentioned, each data structure may have one or more relationships associated therewith, and pairs of related data structures may share more than one relationship. A source snapshot 402, as referred to herein, is a relationship of a snapshot to a block device wherein a block device is created from a snapshot such that a state of data content of the block device corresponds to the data content associated with the snapshot in the snapshot data store. A state of data content of a block device created from a snapshot, for instance, may be identical to a state of data content of a block device of which the snapshot was captured. An initial snapshot 404, as referred to herein, is a relationship of a snapshot to a block device wherein the snapshot is the first snapshot generated from a block device. Resource cost associated with capturing an initial snapshot 404 may be high relative to other operations, and may include a resource cost associated with a cost of reading data content from a data block and writing the data content to the snapshot data store.

As an illustrative example described with respect to FIG. 4, a first snapshot 410 is a source snapshot for a first block device 412, a second block device 414, and a third block device 416. At a time when the first block device 412, the second block device 414, and the third block device 416 are respectively created from the first snapshot 410, a state of data content of the first block device 412, the second block device 414, and the third block device 416 are identical. It should be noted, however, that the first block device 412, the second block device 414, and the third block device 416 may be respectively created at different times. A second snapshot 418 may be captured of the first block device 412 at a first time $t_1$, a third snapshot 420 may be captured of the second block device 414 at a second time $t_2$, and a fourth snapshot 422 may be captured of the third block device 416 at a third time $t_3$. One or more of the first time $t_1$, the second time $t_2$, and the third time $t_3$ may be different times than each other, or may be the same. The data content stored in the snapshot data store for each of the respective snapshots may be different, although portions of the data content stored may be the same. The second snapshot 418, the third snapshot 420, and the fourth snapshot 422 are initial snapshots 404 respectively reflecting a state of data content of the first block device 412, the second block device 414, and the third block device 416.

An incremental snapshot 408 is a snapshot captured of a block device wherein a previous snapshot was taken at a point in time before the incremental snapshot 408. The representation management service may track or cause to be tracked, in association with each snapshot, the data content stored in the snapshot data store. For instance, snapshot metadata may be associated with each snapshot that indicates information about the snapshot. Non-limiting examples of such metadata include as a block identifier identifying a block device from which the snapshot was captured, a lineage level of the snapshot (e.g., how many snapshots are in a chain of snapshots), identification information corresponding to the cell of the snapshot (e.g., identification information of a set of physical devices on which data content of the corresponding block device is stored), and family details of the snapshots and/or block devices, by way of non-limiting example. As a result of capturing an incremental snapshot 408, the snapshot service may cause data chunks to be stored that are different than the data chunks stored as a result of the previously captured snapshot(s) associated with the block device. As an example, the data content stored for an incremental snapshot may be the data content of the block device that has changed since capturing a previous snapshot. A resource cost of capturing an incremental snapshot 408 includes obtaining one or more of the previous snapshot(s) of the block device and associated data. In FIG. 4, the data content stored as a result of capturing the incremental snapshot 424 may be the data content of the first block device 412 that is different at a time $t_4$ than the data content of the block device 412 (and thus the initial snapshot 418) at time $t_1$.

A checkpoint 406 is the last completed snapshot, whether full (initial) or incremental, obtained of a given block device, and thus reflects the most recent state of data content for which a snapshot has been taken for that block device. A completed snapshot is a snapshot in which the entire data content of a block device at a given point in time corresponding to the snapshot has been copied to the snapshot data store, either as reflected entirely in the specific snapshot or in combination with one or more predecessor snapshots (in the case that the checkpoint/last completed snapshot is an incremental snapshot). Although the number of snapshots for a block device may increase, there will still always be a single checkpoint for a block device at a given point in time; however, more than one block devices may correspond to a single checkpoint 406. If, for instance, a block device is created and a snapshot is not generated for the block device, the checkpoint for the block device is the snapshot used to create the block device. In FIG. 4, as a result of the snapshot 424 being completed after $t_4$, the snapshot 424 is the checkpoint for the first block device 412. Snapshot 424 is also the checkpoint for newly created block device 426, for which no initial snapshot yet exists. Similarly, snapshot 424 is the checkpoint for block device 428 created from snapshot 424 until initial snapshot 438 is created after $t_6$, at which point snapshot 438 becomes the checkpoint for block device 428.

As previously mentioned, non-checkpoint snapshots—that is to say, snapshots which have been superseded by newer snapshots for a given block device—may themselves be source snapshots for new block devices. As illustrated in FIG. 4, an initial snapshot 422 is taken of block device 416 at t3 and, at a later time t5, an incremental snapshot 434 is also taken. Accordingly, the checkpoint for block device 416 becomes snapshot 434. However, superseded snapshot 422 becomes the checkpoint for new block device 432 created therefrom. When block device 436 is created from snapshot 434, snapshot 434 becomes the checkpoint for the new block device 436, as well as remaining the checkpoint for block device 416.

The resource costs of creating the various relationships illustrated in FIG. 4 are incurred by systems/services associated with the data structures. One or more services associated with a cell to which the data structures are assigned incurs resource costs to perform mutation operations (e.g., capturing snapshots). For instance, a service associated with the cell may, in response to a request to capture a snapshot (e.g., initial snapshot 404), cause data "chunks" to be transferred from block device data storage to a physical host of the cell. As the number of mutation operations associated with a cell increase, so too do the resource costs incurred by the services/systems of the cell. The representation management service may, in response to determining that a cell is 'hot', transfer one or more 'hot' portions of the cell into a second cell, thereby transferring load from the cell to the second cell, and alleviating load on systems/services associated with the cell. In some embodiments, a given newly created block device may remain in the cell as the initial checkpoint is the source snapshot from which the block device was created (and thus, imposes little or no mutation cost). However, to the extent a given "branch" involves creation of new snapshots, particularly initial snapshots, the "hotness" may increase and the various services described herein may, if the "hotness" within the cell 430 and/or some portion thereof increases to and/or beyond a given threshold, generate a new cell to which to migrate a given new volume. In some embodiments, the likelihood of a given block device generating a large number of costly mutations in the future, such as by generation of a large number of additional block devices from a given snapshot, can be determined by observing historical rates at which a given completed snapshot is used as the source for a new block device, the frequency and/or number of changes to the checkpoint for a given block device, the depth and/or lineage of a graph or other structure representing the relationships between the various data structures, and the like.

Figure 5:
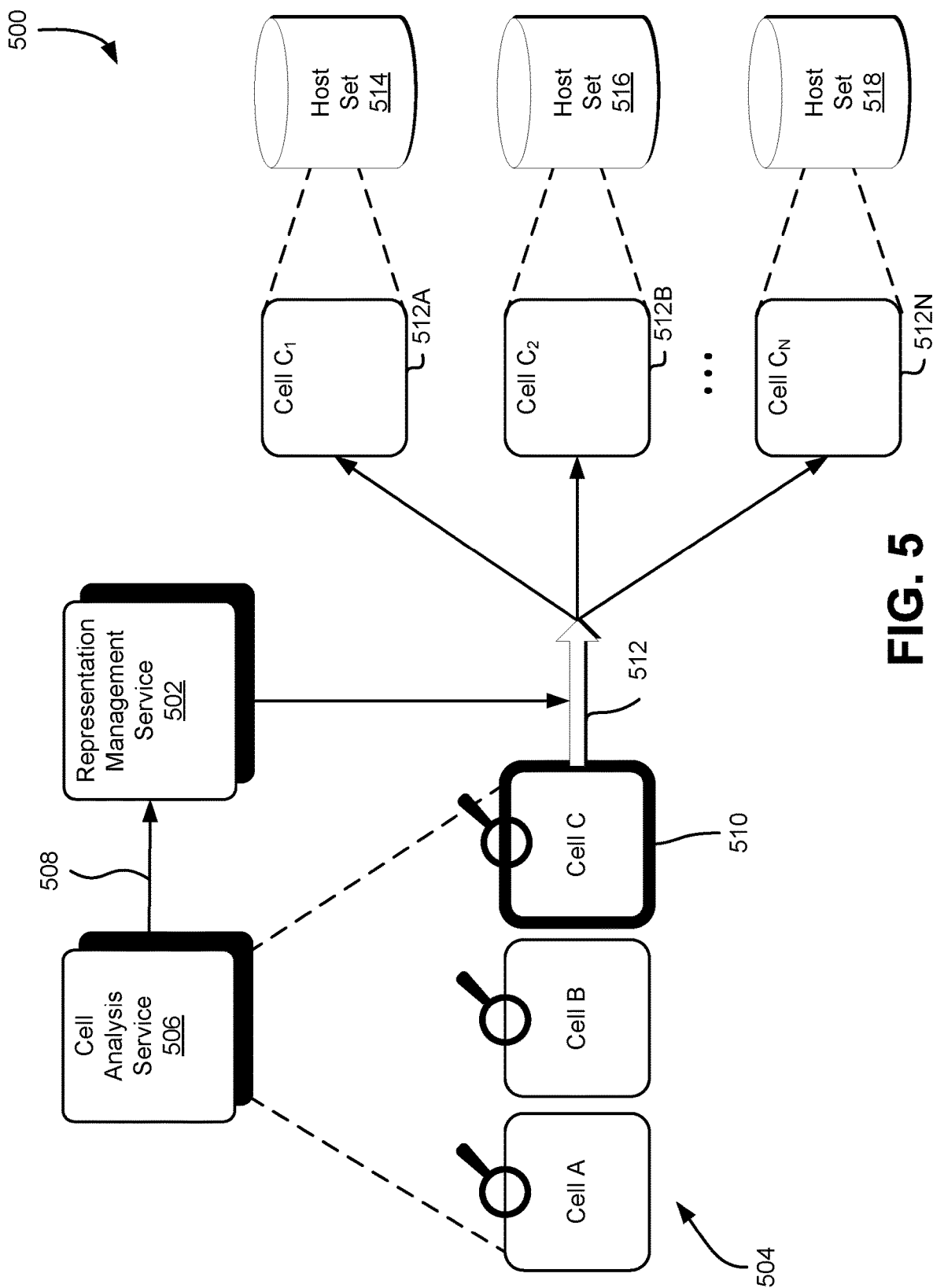
FIG. 5 illustrates an environment in which the representation management service partitions a cell into a plurality of cells, according to one or more embodiments.

FIG. 5 illustrates an environment in which the representation management service 502 partitions a cell into a plurality of cells, according to one or more embodiments. The representation management service 502 may generate representations of relationships between data structures, and may partition the data structures and relationships between data structures into one or more cells. In the environment 500, the representation management service 502 may generate one or more representations organized among a set of cells 504. Although three cells are depicted in the set of cells 504 by way of example, the set of cells 504 may comprise any number cells. One or more of the set of cells 504 may contain data structures that have relationships to data structures within the same cell and/or to those in other cells, and one or more of the cells 504 may be self-contained representations comprising data structures not having relationships to data structures in other cells.

A cell analysis service 506 may monitor the set of cells 504 to determine whether one or more cells should be partitioned based on operational characteristics of computing resources associated with the cells. The cell analysis service 506 may be a computer system, or abstraction thereof (such as a one or more virtual machines operating via a hypervisor), implemented using hardware and software, and may comprise one or more processors and memory that stores executable instructions whose execution by the one or more processors causes the computer system to perform operations described herein, including providing some or all of the functionality described as a service accessible to entities connecting to the implementing computing resource service provider. The cell analysis service 506 may measure the 'hotness' of each of the cells in the set of cells 504 and, as a result of determining that one or more of the set of cells 504 is 'hot', partition the 'hot' cells into a plurality of cells. Although the cell analysis service 506 and the representation management service 502 are depicted and described as being separate services with respect to the environment 500, the cell analysis service 506 and the representation management service 502 may be part of the same service in some embodiments.

Measuring 'hotness' of a cell includes ascertaining a concentration of mutation operations and/or mutation traffic associated with a cell. Mutation operations are operations that change a state of a data associated with a block device. Mutation operations, for instance, are operations resulting in transfer (e.g., push) data chunks from a first data store to a second data store. As an example, creating a snapshot may result in data content being transferred (e.g., copied) from a block device and written to memory location(s) corresponding to the block device in a snapshot data store. As another example, modifying an existing snapshot (e.g., capturing an incremental snapshot) may result in transferring data content from a block device and written to memory location(s) corresponding to the block device in a snapshot data store. Such mutation operations may include transferring of data over an extended period of time due to the size and/or complexity of the data content. This may result in a significant resource cost to a snapshot service of one or more datacenters to complete. 'Hotness' may be measured by a number of mutation operations performed or scheduled to be performed by services/systems associated with a cell. 'Hotness' may be based on a concentration of mutation operations associated with a cell, such as number of mutation operations performed or scheduled to be performed in a period of time. Measuring 'hotness' may include determining an area of a cell, such as a set of data structures, that are causing the mutation operations, and various types of operations may include a greater or less number of mutation operations (and, thus, impart varying levels of "hotness"). Moreover, 'hotness' may be determined with respect to comparison to one or more predetermined thresholds (e.g., values set in memory, defined by an administrator of the implementing system and/or a customer entity associated with the data represented by the data structures) such that a 'hot' cell or area in a cell is determined as a result of the number of associated mutation operations equaling and/or exceeding a predetermined number of threshold operations.

The cell analysis service 506, as a result of determining a 'hot' cell or area of a cell, may cause the representation management service 502 to partition the 'hot' cell into a plurality of cells. In one embodiment, the cell analysis service 506 may send a communication 508, such as a command or notification, to the representation management service 502 indicating that a cell is 'hot'. The communication 508 may include information identifying the cell and/or particular data structures within a cell causing the 'hotness'. As a result, the representation management service 502 may partition the cell into a plurality of cells, as described below in greater detail. In the representation 500, for example, the cell analysis service 506 may monitor the mutation operations performed or scheduled for performance in association with each of the set of cells 504. The cell analysis service 506 may determine that a cell 510 (Cell C) is 'hot' as a result of, e.g., a number of mutation operations for the cell 510 exceeding a predetermined threshold for mutation operations. The cell analysis service 506 may send the communication 508 to the representation 502 identifying the cell 510, including specific data structures therein, as being 'hot'. As a result, the representation management service 502 may partition 512 the cell 510, cell C, into a plurality of cells 512, $C_1$ through $C_N$. In one embodiment, the representation management service 502 may bifurcate the cell 510 such that the number of cells in the plurality of cells 512 is two; however, the number of cells in the plurality of cells 512 is not particularly limited. In general, the number of cells in the plurality of cells 512 is chosen so as to appropriately distribute load associated with expected, forecasted, and/or scheduled future mutation operations.

Partitioning may include allocating one or more sections of memory of hosts, such as logical or physical hosts, in one or more datacenters for storage of data content associated with a 'hot' cell. The representation management service 502 may assign, or cause to be assigned, memory of a set of hosts for storing data content corresponding to the cell 510. Each set of hosts may be separate or disjoint from the hosts in other sets of hosts such that the hosts in one set are not contained in another set. In the environment 500, for instance, a first cell 512A may be assigned to a set of hosts 512 and a second cell 512B may be assigned to a second set of hosts 516, wherein the set 516 is disjoint from the set 514 and vice versa. In one embodiment, the set of hosts 514 of the first cell 512A is the same as the hosts assigned for storage of data content of the cell 510. The sets of hosts may include snapshot data storage for each of the respective cells to which they are assigned.

The representation management service 502 may determine membership of data structures in the cell 510 to the plurality of cells 512 based on a hash function. For example, the representation management service 502 may perform, or cause performance of, a hash ring or other form of consistent hashing is used to distribute membership of the data structures in the cell 510 among the plurality of cells 512. An immutable consistent hash ring (or other method for obtaining consistent hashing), is used to perform a hash function on identifiers of the block devices in the cell 510 and data content corresponding to the hash values obtained thereby is distributed according to hash value ranges assigned to each of the set of cells 512. A consistent hash ring is considered to be immutable when the positions or ranges within the consistent hash ring are fixed such that the hash of a value will always point to the same position or range every time the value is hashed (e.g., identification information will always point to the same position on the consistent hash ring based at least in part on a hash of the identification information). As a result, one or more block devices that were initially assigned to the cell 510 may be assigned to the first cell 512A and one or more block devices that were initially assigned to the cell 510 may be assigned to the second cell 512B. This may help to distribute load from the cell 510 to other cells in the plurality of cells 512, thereby alleviating resource usage on computer systems (e.g., snapshot service computer systems) associated with the cell 510 (which may correspond to the first cell 512A).

Figure 6:
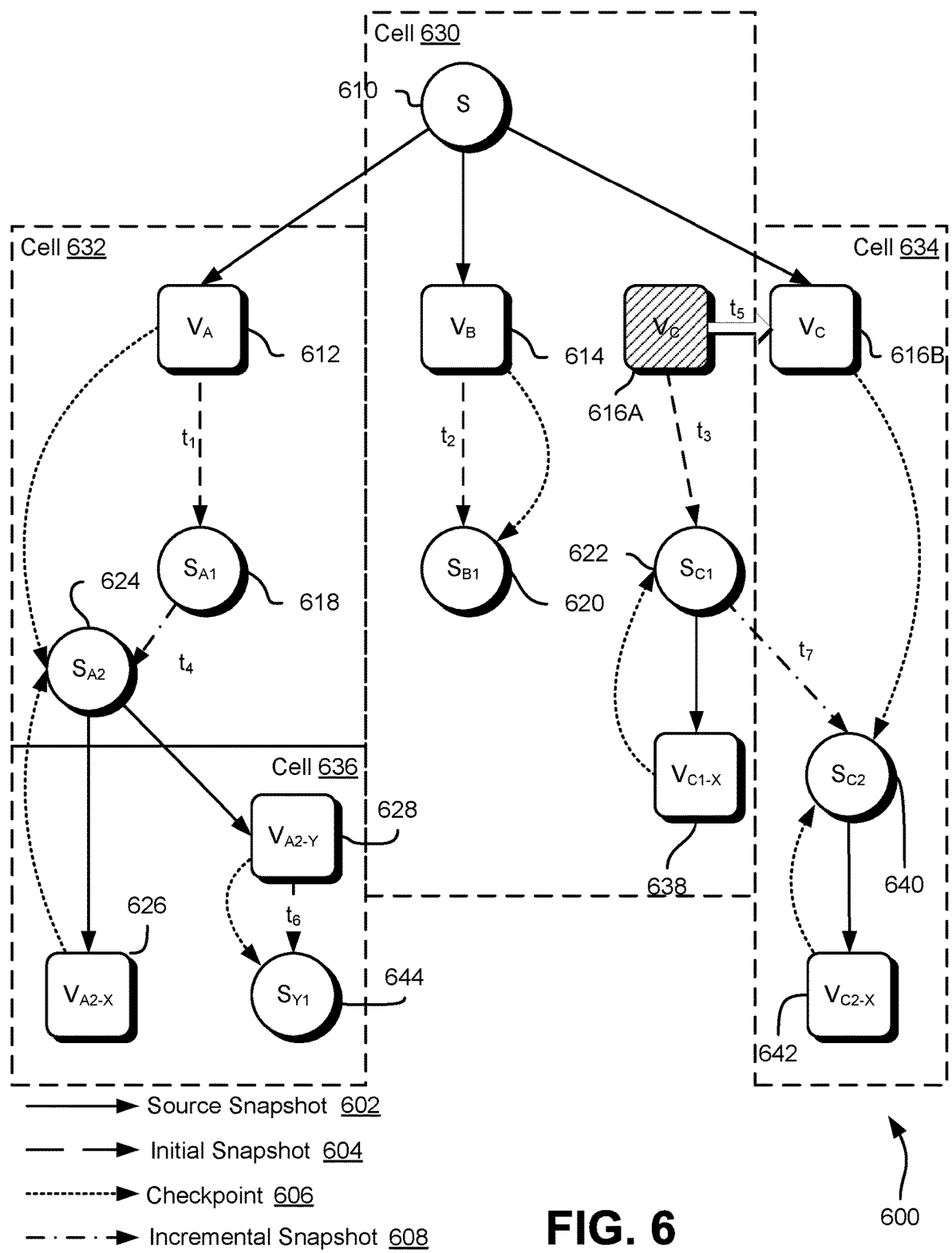
FIG. 6 illustrates a diagram in which the data structures of a cell are partitioned into the plurality of cells, according to one or more embodiments.

FIG. 6 illustrates a diagram 600 in which the data structures of a cell, such as depicted in FIG. 4, are partitioned into the plurality of cells, according to one or more embodiments. For purposes of illustration, the set of hosts for the cell 430 may be the same as the physical devices of a cell 630. The representation management service may determine that one or more block devices of the cell 430 are 'hot' as a result of, for example, a large number of mutation operations being performed or scheduled. For instance, the representation management service may determine that the 'hotness' of the cell 430 is associated with transferring 'chunks' of data content of a second block device 414 to a first block device 412, and therefore partition block device 412 (e.g., 612) into a new cell 632, as the service may predict that such operations may result in a high likelihood and/or cost of future mutation operations (e.g., generating new snapshots).

Furthermore, after a first (initial, full) snapshot 618 being generated of the first block device 612 at $t_1$, additional data is copied to (or removed from) the block device 612. Thereafter, at time $t_4$ after the data is updated, an incremental snapshot 624 is generated of the first block device 412, and the delta between the states at t4 and t1 is determined by the snapshot service and stored as part of the incremental snapshot 624. The representation management service may determine that the cell 632 is 'hot' as a result of the concentration of mutation operations associated with fulfillment of the incremental snapshot 608 (e.g., transferring 'chunks' of data content to the snapshot data store for the cell 430), or by determining that such operations may result in future mutation operations resulting from additional volumes associated with the incremental snapshot 624 (e.g., block devices 626, 628 and snapshot 644). Therefore, the representation management service may further partition the cell 632 to place block devices 628 and 626 into new cell 636.

Partitioning the cell may include allocating memory and/or other computing resources in a second set of hosts different than the set of hosts of the cell 430 (i.e., cell 630). For instance, the representation management service may cause allocation of memory for a second cell 632. As mentioned, the block device 612 may be assigned to the second cell 632 to alleviate load on one or more hosts associated with the first cell 630, and thus, metadata and/or actual data content of (or otherwise associated with) the block device 612 (e.g., associating the block device with locations of source and/or other snapshots, as well as to the cell 630) may be transferred from hosts associated with cell 630 to hosts associated with cell 632. Furthermore, initial snapshot 618 corresponding to the state of data in the block device 612 at time $t_1$, as well as incremental snapshot 608 corresponding to a state of the data content of the first block device 612 at a later time $t_4$, are processed, generated, and/or stored (or caused to be stored) by the hosts corresponding to cell 632. In an embodiment, the snapshots remain associated with the cell 632 in which they are generated, regardless of whether a block device is partitioned/migrated into a new cell.

As described herein, the data content migrated to the second cell 632 may correspond to data content that is different in the first block device 612 at a time $t_4$ than the data content of the of the first block device 612 at the time $t_1$. For instance, the data content migrated to the set of hosts corresponding to the cell 632 may be data content of the first block device 612 present at a time $t_4$ that was not present at a time $t_1$, or data content that was changed in the first block device 612 in a time period between $t_1$ and $t_4$. The data content corresponding to the initial snapshot 618 (i.e., data content at a state of the first block device 612 at a time $t_1$) may therefore remain unchanged in the snapshot data store for the cell 632. The resource usage associated with migration of data content from the block device 612 to the snapshot data store for the cell 632 is thereby transferred to the services/systems (e.g., hosts, snapshot service) corresponding to the cell 632, reducing load on the services/systems of the cell 630. Additional data structures generated, at a time after the time $t_4$, corresponding to the first block device 612 may be assigned to the cell 632 instead of the cell 630.

As mentioned, new cells, such as cell 632, may themselves be partitioned in the fashion described so as to ameliorate "hotness" in those cells. For example, at a time after $t_4$, new block devices 626 and 628 are generated and are initially associated with cell 632. However, the cell analysis service may determine that block devices 626 and 628 are likely to generate a mutation operation level in cell 632 that is higher than the aforementioned threshold (e.g., as a result of the initial snapshots to be generated from those block devices). In response, the cell analysis service may cause a new cell 636 to be generated, such as by the representation management service, and further cause the block devices 626 and 628 to be associated with the new cell 636.

After assignment to the cell 636, the checkpoint for the block devices 626 and 628 may remain at snapshot 624, which remains assigned to cell 632. As such, at time $t_6$ when initial snapshot 644 is generated from block device 628, initial snapshot 644 is generated by the hosts associated with cell 636 by, e.g., transferring data corresponding to both snapshot 624 and 618, which is maintained by one or more hosts associated with cell 632, as well as any delta in the data content between times $t_6$ and $t_4$. However, as the checkpoint for block device 628 moves to the newly created snapshot 644 in the same cell, any subsequent snapshots of block device 628 will not require cross-cell transfer or other communication, as the data on which the subsequent snapshots are based remain on the same set of hosts associated with the cell 636.

In an embodiment, data structures, such as block devices, are partitionable into new cells even after they have established a lineage of other data structures dependent therefrom. For example, in original cell 630, if block device 614 is associated with a new cell after time t2 (and thus after generation of initial snapshot 620), future data structures, such as incremental snapshots, new block devices dependent therefrom, etc., are generated in the new cell, while initial snapshot 620 remains maintained by cell 630. In some embodiments, further block devices generated using snapshot 610 or snapshot 620 as their source snapshot are administered as part of cell 630, while further snapshots and/or block devices generated therefrom after block device 614 has been partitioned into the new cell, are administered as part of that new cell.

As another illustrative example, an initial snapshot 622 may be captured of the third block device 616A at time $t_3$, when the block device 616A is associated with cell 630. Accordingly, initial snapshot 622 is generated and maintained as part of cell 630. At a time t5, after t3, a new cell 634 may be allocated based on 'hotness' of the cell 630 exceeding a predetermined threshold, in anticipation of a high level of future mutation activity on the branch of the graph (e.g., as a result of being notified of such, such as by a customer of the implementing computing resource service provider, at the behest of an administrator of the aforementioned computing resource service provider, etc.). As part of the determination to partition a new cell 634, the block device 616A is migrated to cell 634 (i.e., as depicted in FIG. 6 as migrated block device 616B). While initial snapshot 622 remains associated with cell 630, and new block devices (e.g., 638) generated therefrom are also associated with cell 630, any further snapshots generated of the migrated block device 616A-B are allocated to the new cell 634. For example, at time t7 (after migration of block device 616A-B at time t5), the new incremental snapshot 640 is associated with the new cell 634, and any subsequent block devices generated from snapshots created as such (e.g., block device 642) are associated with the new cell 634. As illustrated, unless an initial snapshot has not yet been created of a newly migrated block device, the checkpoint snapshots for the various block devices in a cell remain within the cell, and thus snapshot generation and other tasks pertaining to the data structures within the cell are processed locally to the cell (e.g., on the associated set of hosts).

As depicted, each of the cells in the representation 600 may be rooted to a data structure to which the remainder of the data structures in the cell relate. In one embodiment, the root node for each cell is a snapshot. The cell 630 is rooted to a snapshot 610, the root node for the second cell 632 is the initial snapshot 618, the third cell 636 is rooted in the initial snapshot 644, and the fourth cell is rooted in the incremental snapshot 640. The "orphan" snapshot 622 may be considered a "second" root of cell 630, or, in some embodiments, may be considered a child of primary node 610, as it remains related by lineage (e.g., through block device 616A-B). In some embodiments, however, cells may be rooted to a different data structure (e.g., block devices), or more than one type of data structure. A root node of a cell means that all other data structures of the cell are derived from the root node data structure. Each representation may be maintained for an account (e.g., user, group of users for a customer) such that all representations, cells, and data structures are protected from access by users unauthorized for the account.

Figure 7:
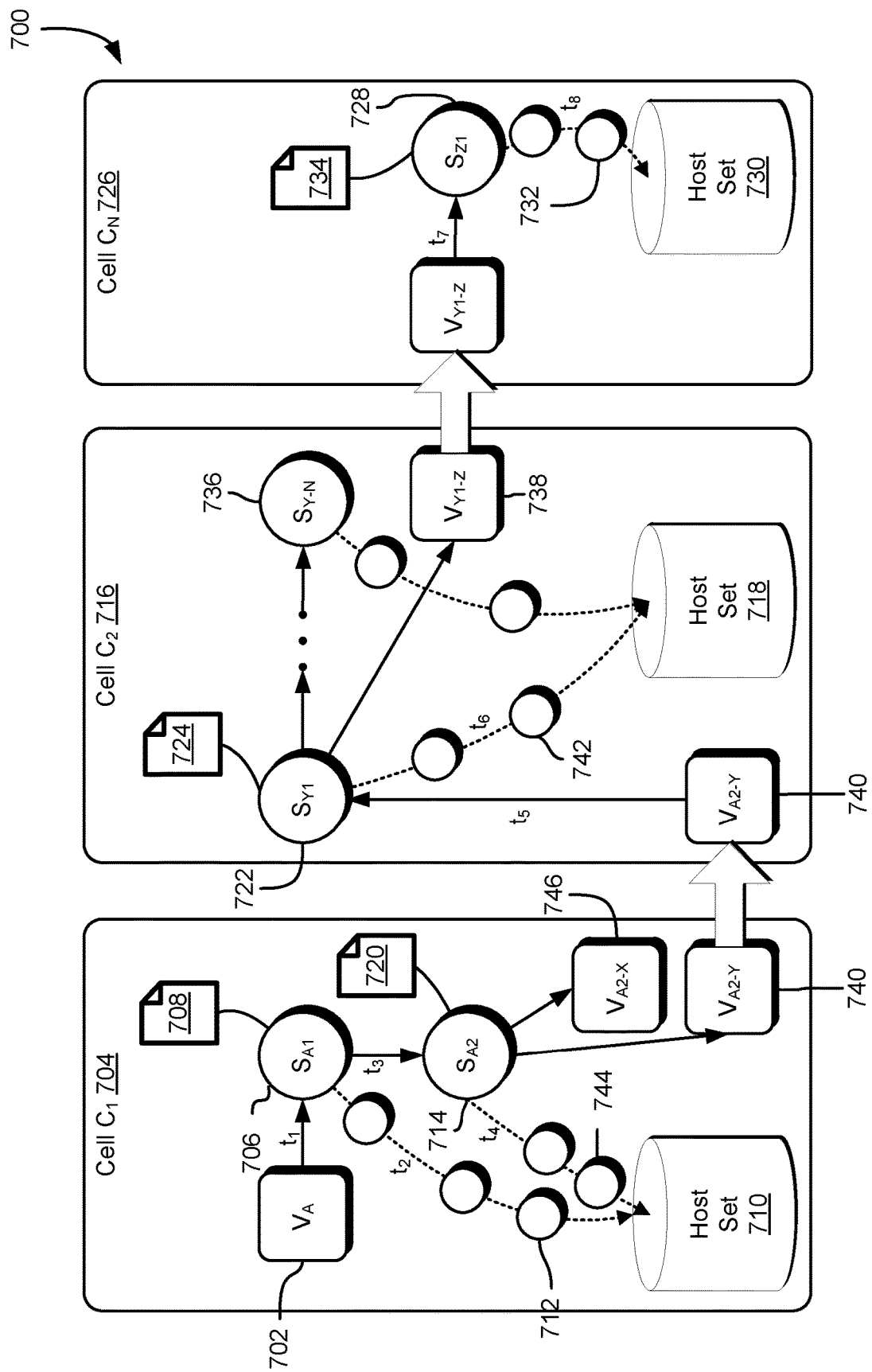
FIG. 7 illustrates an environment in which various data structures are assigned to one or more cells, according to one or more embodiments.

FIG. 7 illustrates an environment 700 in which various data structures are assigned to one or more cells, according to one or more embodiments. Data content for snapshots of block devices of a cell may be stored in a set of hosts corresponding to the cell. Other cells may be generated based on a determination that the cell is 'hot', e.g., by virtue of the cell having a large number of associated mutation operations. Various operations involving data content and metadata may be performed in association with the cells using data content and metadata.

A block device 702 may be located in (e.g., assigned to) a first cell 704. A snapshot service associated with the first cell 704 may create, at a time $t_1$, a snapshot 706 of the block device 702, e.g., in response to receiving a request to generate a snapshot or in response to detection of some other predetermined event (e.g., a period of time has elapsed, a predetermined amount of data content generated for the first block device 702). Metadata 708 may be included in, or associated with, the snapshot 706 indicating information about the snapshot 706. The metadata 708 may include, by way of non-limiting example, a block identifier identifying the block device 702 from which the snapshot 706 was captured, a lineage level of the snapshot 706 (e.g., how many snapshots are in a chain of snapshots), identification information corresponding to the cell 704 of the snapshot 706, and family details of associated snapshots and/or block devices (e.g., version number, account identifier). The metadata 708 may comprise routing information useable to route data contents of the first block device 702 to and from a set of hosts 710 for storing and retrieving the data content. The routing information may include network location information for the set of hosts 710 (e.g., IP address, host address, physical location, network address information), memory address information of memory of the set of hosts 710, and any other appropriate location information. A routing layer of the snapshot service may use the routing information to transfer data contents from the corresponding block device, and/or to other hosts for creating snapshots.

Memory in the set of hosts 710 may be allocated for storage of data contents for, and/or metadata associated with, data structures in the cell 704. For example, memory for the cell 710 may be reserved and assigned to the cell 704 for storing data content. The amount of memory may be changed to accommodate a need for data content. Such operations may be performed by an appropriate entity, such as the snapshot service, in response to determining a root node for a cell.

As a result of creation of the snapshot 706, the snapshot service may transfer (e.g., copy) data content 712 from the block device 702 to the set of hosts 710. To capture a state of data content of the block device 702 at the time that the snapshot 706 was initiated, the snapshot service may transfer (e.g., copy), or cause transfer of, data chunks 712 from the block device 702 to the assigned memory of the set of hosts 710. The transfer of the data chunks 712 may take a period of time to complete due to, e.g., network bandwidth limitations. That is, the data chunks 712 may be transferred over a period of time $t_2$ after the time $t_1$. Transferring data chunks over time may represent a significant resource cost for the set of hosts 710. For example, generating an initial snapshot may include transferring the entire data content located, via data chunks 712 in a block device over the time period $t_1$. Creating an incremental snapshot 714 may comprise transferring less than the entire data contents 744 of the block device 702, e.g., the delta of the state of the data in the block device 702 between t1 and t3, but may also comprise obtaining metadata 708 associated with one or more previous snapshots (e.g., snapshot 706).

The representation management service may monitor the resource usage associated with the first cell 704, cell $C_1$, and decide to partition the first cell 704, such as in response to creation of block devices 740 and 746 (which will, in an embodiment, result in creation of a full, initial snapshot after generation of the block devices). For instance, the representation management service may determine that the first cell 704 is 'hot' as a result of ascertaining that the resource cost associated with activity in the cell 704 will exceed a predetermined threshold as a result of future creation of initial snapshots from both block devices 740 and 746. The representation management service may then create a second cell 716, which may include allocation of memory of a second set of hosts 718, and migrate, as illustrated, block device 740 to the new cell 716.

New data structures relating to the migrated block device 740 that are initiated or created at a time $t_5$ after the second cell 716 is created are assigned to the second cell 716. For instance, a snapshot service may create, or initiate creation of, an initial snapshot 722, of the block device 740 in the second cell 716 in response to, e.g., receiving a user request to generate a snapshot, in connection with generation of the block device 740, and/or in connection with the migration of the block device 740 to the cell 716. As a result of creating the initial snapshot 722, data chunks 742 of data content of the block device 740 may be transferred to the set of hosts 718 over a period of time $t_6$ after the time $t_5$. The data chunks 742 are data content created on the block device 740 after the time $t_5$, or data content modified on the block device 740 after the time $t_5$. Furthermore, in some embodiments, to complete the initial, full snapshot 722, the host set 718 may initiate transfer, from the host set 710 to the host set 718, of snapshot data reflecting the last snapshotted full state of the data in block device 740 (e.g., chunks 712 and 714). The host set 718 may generate, as part of this snapshotting process, metadata 724 indicating various information regarding the snapshot 722 as described above. The metadata 724 may include different information than either the metadata 720 of the predecessor incremental snapshot 714 and/or metadata 708 of the further preceding snapshot 706. For example, the metadata 724 may indicate location information of data content in the set of hosts 710 corresponding to a state of data content of the block device 702 at the time $t_3$ as well location information of data content in the set of hosts 718 corresponding to the state of data content of the block device 740 at time $t_5$. By contrast, metadata 720 may indicate location information of data content in the set of hosts 710 corresponding to a state of data content of the block device 702 at the time $t_3$. In particular, the metadata 724 may reflect for a data state at the time $t_5$ data content, and location thereof, of the block device 740 after migration to cell 716, while metadata 720 may reflect a different state, and different location thereof (e.g., 710) of the block device 740 prior to migration. The metadata 724 may also indicate information regarding the metadata 720, such as location information or identification information of the metadata 720. Transfer of the data chunks 744 may be performed in parallel to the transfer of the data chunks 742 such that the time period $t_4$ may, at least in part, overlap with the time period $t_6$.

The second cell 716 may comprise one or more additional incremental snapshots 736 of the block device 740 created of the block device 740 at a time after the time $t_6$. Each additional incremental snapshot 736 may cause transfer of data chunks from the block device 742 over a time period, and each additional incremental snapshot 736 may be associated with its own corresponding metadata 724 indicating various information regarding the additional incremental snapshot. As a result of the actual or expected cost associated with one or more data structures, the representation management service may determine that the second cell 716 has also become 'hot' and create a third cell 726. For instance, as a result of creation of an additional block device 738, the representation management service may create the third cell 726 and allocate memory of a set of hosts 730 to the third cell 726, and migrate the block device 738 to cell 726. As a result, the snapshot service may transfer to host set 730, over a time period $t_7$ after the time $t_6$, data chunks 732 of the block device 738 corresponding to data content created or modified after the time $t_6$, as well as generate and store metadata 734 (e.g., routing metadata) as previously mentioned. Furthermore, also in a similar fashion as previously described, data reflecting a previous data state may be transferred from host set 718 associated with cell 716 to the host set 730 associated with cell 726 as part of the initial snapshot creation process for the block device 738.

Figure 8:
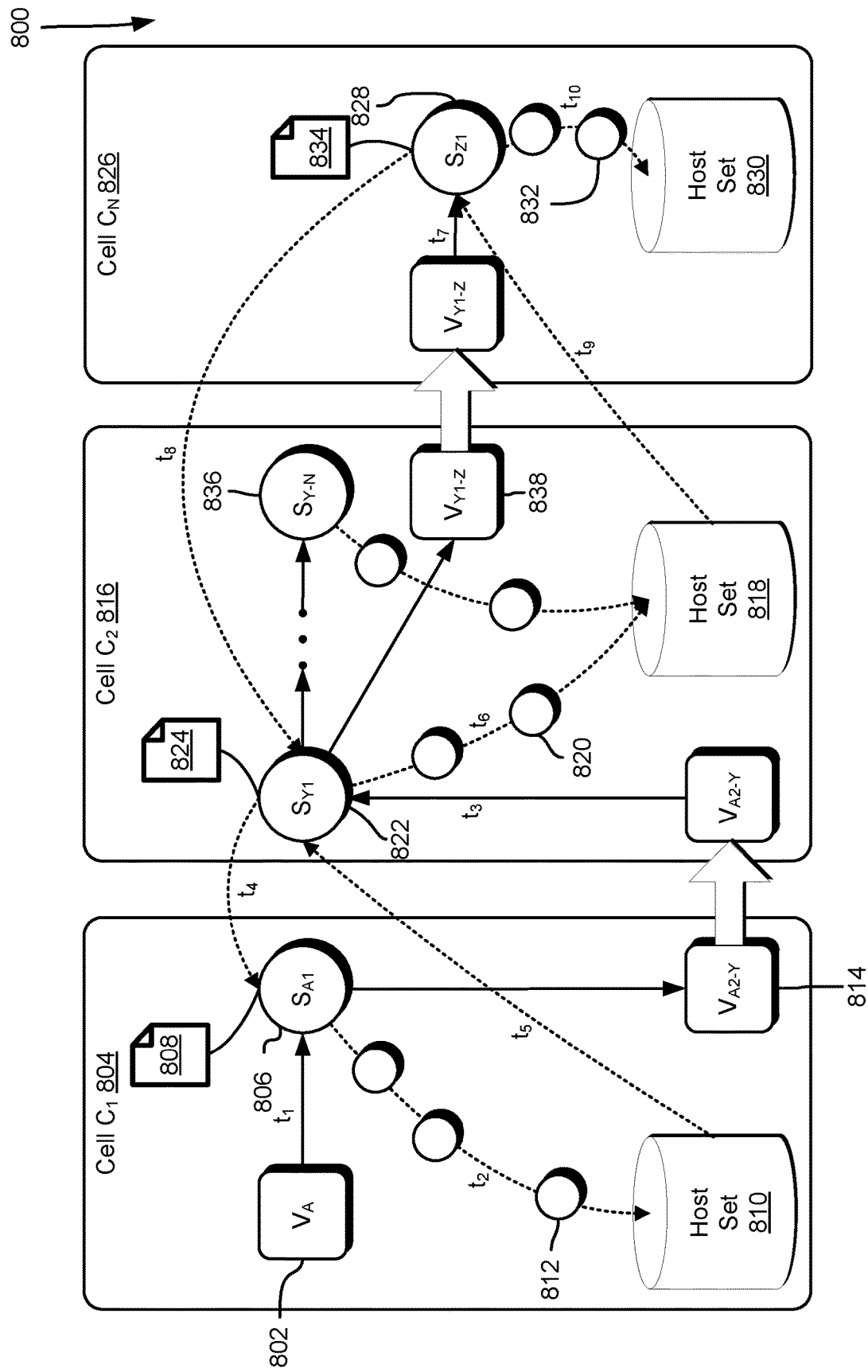
FIG. 8 illustrates an environment in which operations, such as data storage operations, are performed in connection with assignment of associated data structures to cells, according to one or more embodiments.

FIG. 8 illustrates an environment in which operations, such as data storage operations, are performed in connection with assignment of associated data structures to cells, according to one or more embodiments. The elements described with respect to FIG. 8 may respectively correspond to some or all of the elements described above with respect to FIG. 7. A first block device 802 is associated with cell 804. At time t1, an initial snapshot 806, and accompanying metadata 808, is generated by a resource of the host set 810. At time t2, after t1 and, in some embodiments, asynchronously relative to the creation of the snapshot 806, the contents of the block device 802 and the metadata 808 are processed and stored in data storage of host set 810. At some time after t1 (but not necessarily after t2), a new block device 814 is generated from the snapshot 806 and subsequently migrated to new cell 816, which itself may be generated according to techniques described elsewhere herein. At t3, after block device 814 is migrated to cell 816, an initial snapshot 822 is generated by a resource of host set 818 associated with cell 816. Part of the generation process includes generating new metadata 824 that, as previously described, includes a location (e.g., in the host set 818 and/or host set 810) of the snapshot data corresponding to the state of the block device 814 as captured at t3 in snapshot 822. Accordingly, at time t4 and after t3, a resource of host set 818 queries a representation management service, as previously described, to identify the cell to which one or more previous snapshots corresponding to one or more states of the block device 814 (cell 804, snapshot 806). As a result of locating the cell 804, the resource of host set 818 uses corresponding 808 to locate the associated data at host set 810, and at a time t5 after t4, retrieves the data 812, processes it with the delta as previously mentioned to generate the full state of data of snapshot 822 at t3, and stores it using a data store associated with host set 818.

As previously discussed, further incremental snapshots 836 of block device 814 are derived from snapshot 822 and processed, stored, etc. using the same host set 818. To the extent one or more mutation events or cost associated therewith initiates further generation of new cells, e.g., cell 826, and association of data structures therewith (e.g., block device 838), the aforementioned process repeats. For example, as illustrated, at t7, a new initial snapshot 828, including metadata 834, is generated from migrated block device 838. Similarly to previously described, a resource of host set 830 refers, at time t8 after time t7, to a representation management service to determine the location of one or more previous snapshots sufficient to account for the entire state of data in block device 838 at time t7, and accordingly locates metadata 824 associated with snapshot 822. The resource uses metadata 824 to locate the snapshot data 820 associated with snapshot 822, and at time t9 after time t8, causes transfer of the snapshot data 820 to a data store associated with host set 830 so as to process, then store, at time t10 after time t9, the full state of data associated with block device 838 at t7.

As may be contemplated, and as mentioned, metadata from a given cell may be used to obtain not only data content stored in host sets of the same cell, but also data associated with other cells and thus, in other associated host sets. The metadata 824, for instance, may be used to obtain the data content 812 of the block device 802 at t1. A computer system of the second cell 816 (e.g., associated with or using the snapshot 822) may obtain the metadata 808 from the first cell 804 by sending a request, such as an upcall, to a computer system or layer (e.g., routing layer) of the first cell 804 for the metadata 808. The request may include identifying information of the previous snapshot (e.g., 806) from which the snapshot 822 was derived, and to which metadata 824 is associated, as well as information identifying metadata 824 or a portion thereof. The metadata 808 of the initial snapshot 806 may then be transferred (e.g., copied) to the second cell 816. As a result, the data content 812 may be obtained from the set of hosts 818 by, for example, submitting a database query to the set of hosts 818 using identification information (e.g, version number, date or date range of prior snapshot, etc.) of the data content 812 as a parameter. The data content 812 may be collected in memory, such as a memory cache of a block device emulation service, and then be made available for access to authorized computing systems, such as another block device (which itself may be subject to one or more of the partitioning or other techniques described herein).

It should be noted that creating block devices using additional incremental snapshots may involve obtaining metadata from a string of snapshots. For example, incremental snapshot 836 may be the basis of a new block device. As such, one or more previous incremental snapshots including deltas of the block device data state immediately preceding it are assembled, via respective metadata identifying the location and/or content of the data, until the full state of the predecessor block device 814 represented by incremental snapshot 836 is located, retrieved, and assembled. As may be contemplated, this may include retrieval, processing, etc., all the way back to the last "full" snapshot (in this case, initial snapshot 822).

Figure 9:
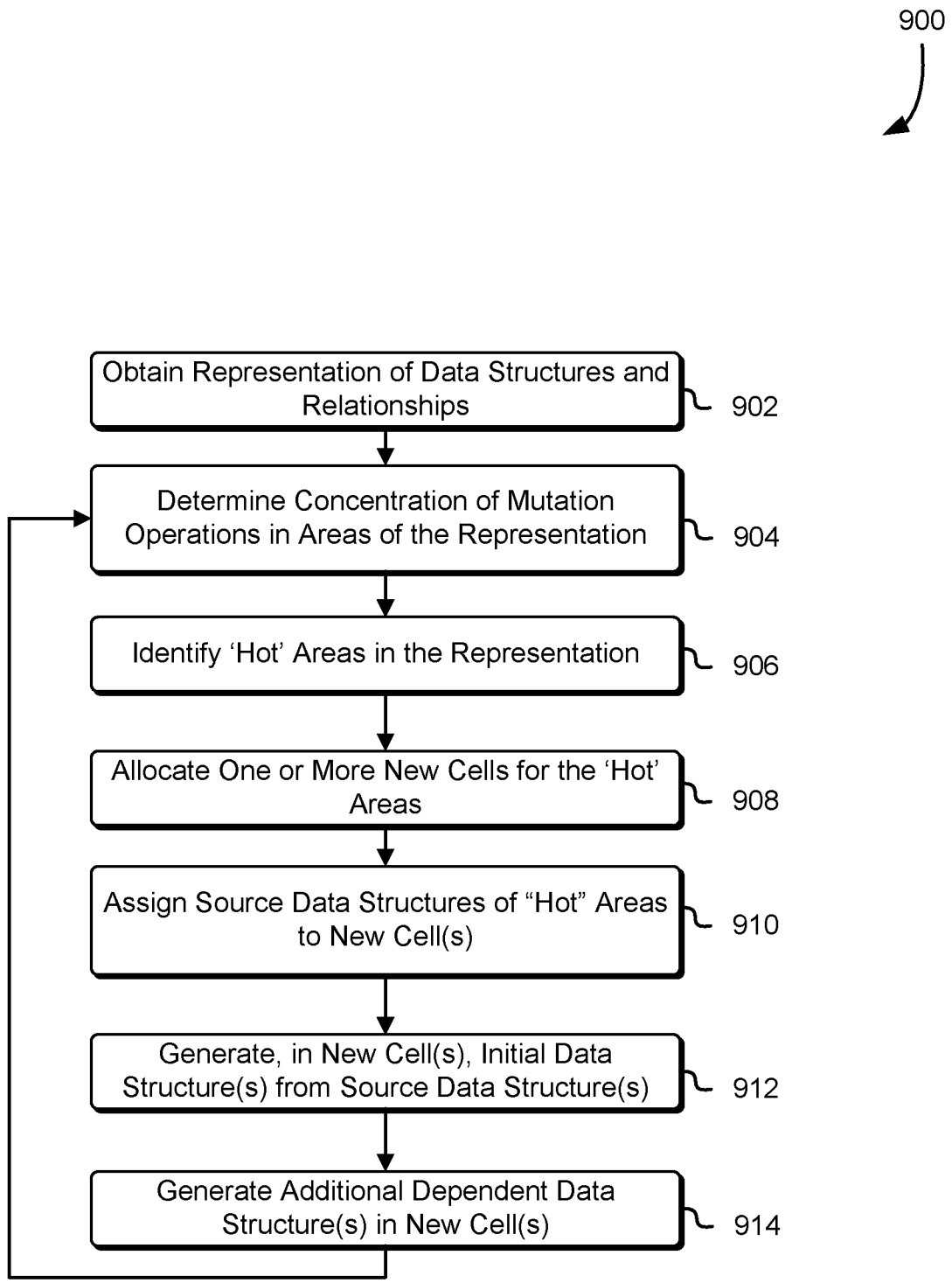
FIG. 9 illustrates a process in which a cell is partitioned according to one or more embodiments, according to one or more embodiments.

FIG. 9 illustrates a process 900 of partitioning a cell according to one or more embodiments. The process 900 may be performed by any appropriate service or computer system described herein, such as the representation management service. The process 900 begins by obtaining 902 an initial graph representation of data structures and representations therebetween, as described above with respect to FIGS. 1, 2, 3, 4, and 5, for example. Obtaining 902 the representation may include obtaining metadata associated with the data structures to determine one or more relationships in the graph representation. Next, the representation management service may measure 904 the concentration of mutation operations associated with one or more data structures of the initial representation obtained. As described above, mutation operations may correspond to data transfer operations for generation, processing, and/or other manipulation of snapshots, such as transferring data chunks from block devices to snapshot data storage and vice versa.

The representation management service may then identify 906 one or more sets of data structures that are 'hot' based on the measured number of mutation operations. As described above, 'hot' data structures may be data structures having a number of associated mutation operations exceeding a predetermined threshold, or whose mutation operations are causing an amount of resource usage exceeding a predetermined threshold. As a result of identifying the 'hot' data structures, the representation management service may allocate 908 one or more new cells, as described above with respect to FIGS. 1, 3, 5, 6, 7, and 8. Allocating 908 a new cell may include reserving memory of a set of hosts separate from the set of hosts of the cell for storing data content of data structures of the cell.

The representation management service may then place 910 one or more data structures in the new cell(s), as described above with respect to FIGS. 1, 3, 5, 6, 7, and 8, for example. Placing 910 may include creating a data structure (e.g., block device, snapshot) in the new cell, or transferring one or more data structures from the cell to the new cell. Placing 910 may also include performing a consistent hashing on identifiers of data structures in the cell and remapping the hash values to correspond to memory addresses of the new cell. At step 912, an initial data structure, such as a snapshot, is generated by the host(s) associated with the new cell from the migrated ("placed") data structure (e.g., a block device). This generation may include transferring data content, and/or metadata associated therewith, from a host set associated with the initial cell to a host set associated with the new cell(s), as described above. For instance, the transfer may include obtaining metadata of a snapshot in another cell, and/or transferring data content from a set of hosts of another cell to the set of hosts of the new cell.

At step 914, additional data structures based on the initial structure generated in step 912, such as incremental snapshots, are generated in the same cell (and thus, by the same set of hosts), and the process optionally repeats by continuously, iteratively, and/or on a periodic schedule, monitoring for and/or determining the concentration of mutation operations in the overall representation (including the new cell, or portion thereof).

Figure 10:
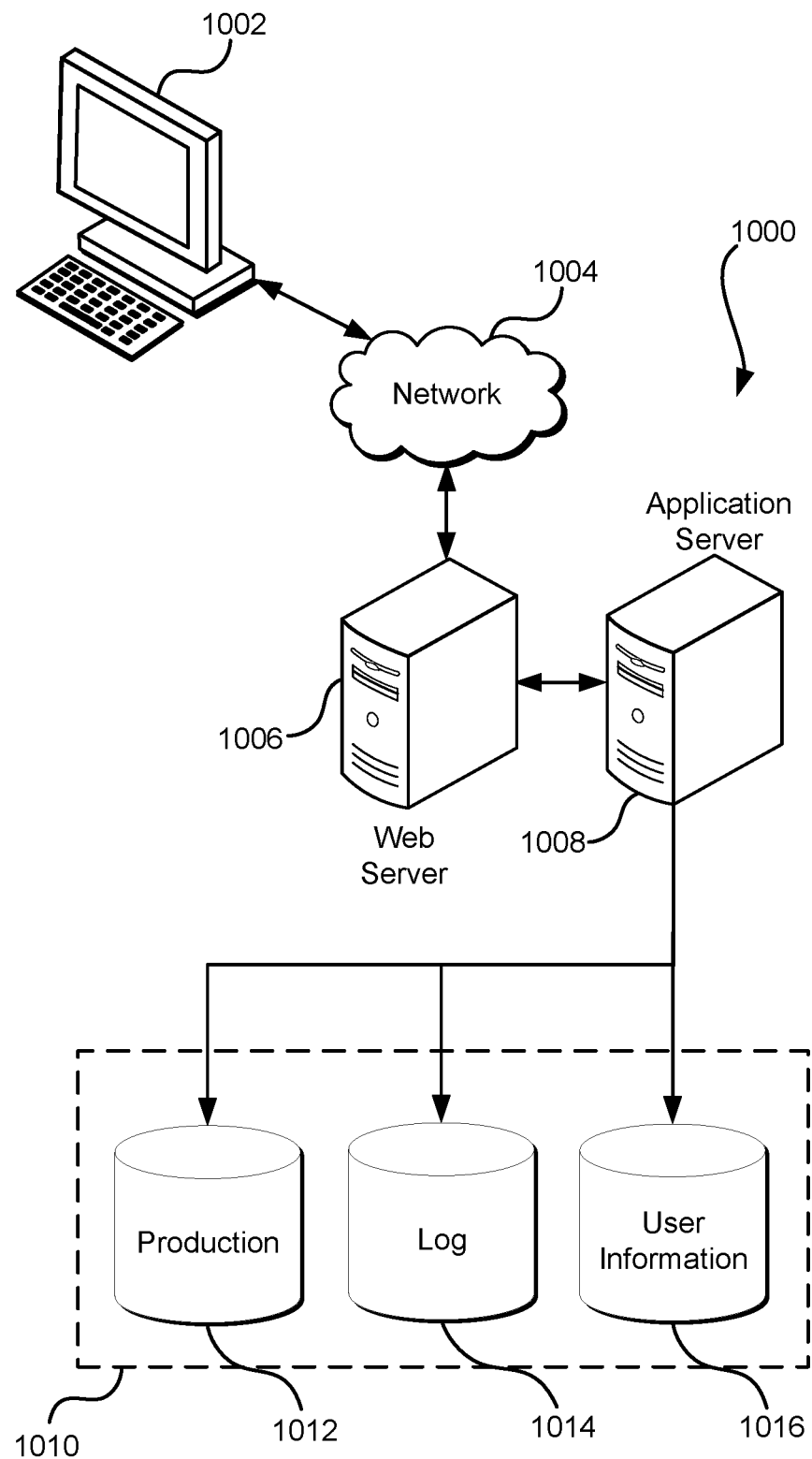
FIG. 10 illustrates a system in which various embodiments can be implemented.

FIG. 10 illustrates aspects of an example system 1000 for implementing aspects in accordance with an embodiment. As will be appreciated, although a web-based system is used for purposes of explanation, different systems may be used, as appropriate, to implement various embodiments. In an embodiment, the system includes an electronic client device 1002, which includes any appropriate device operable to send and/or receive requests, messages, or information over an appropriate network 1004 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 1006 for receiving requests and serving content in response thereto, although for other networks an alternative device serving a similar purpose could be used as would be apparent to one of ordinary skill in the art.

In an embodiment, the illustrative system includes at least one application server 1008 and a data store 1010 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 1002 and the application server 1008, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1010, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1012 and user information 1016, which are used to serve content for the production side. The data store also is shown to include a mechanism for storing log data 1014, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1010.

The data store 1010, in an embodiment, is operable, through logic associated therewith, to receive instructions from the application server 1008 and obtain, update or otherwise process data in response thereto and the application server 1008 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1002. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1000 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 1000, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C # or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining a representation indicating relationships between a set of block devices and a set of snapshots of the set of block devices, the representation including a first cell comprising a set of data structures corresponding to the snapshots and the block devices, the first cell associated with a first set of hosts;
    determine that a mutation operation level associated with the first cell at least meets a threshold to partition the first cell;
    determine, based on the mutation operation level and the threshold, a first data structure of the set of data structures, the first data structure corresponding to a block device of the set of block devices;
    partitioning the first cell to generate a second cell associated with a second set of hosts;
    migrating the first data structure to the second cell; and
    associating a new snapshot of the block device and outside of the set of snapshots, with the second cell.

2. The computer-implemented method of claim 1, wherein partitioning the first cell includes performing a consistent hashing on block device identifier information of the set of data structures, and migrating the first data structure to the second cell includes assigning the block device to the second set of hosts using the block device identifier information.

3. The computer-implemented method of claim 1, wherein associating the new snapshot with the second cell comprises:
    copying, from the first set of hosts to the second set of hosts, a first set of data chunks corresponding to a data state of the block device at a first time prior to the migrating;
    determining, by the second set of hosts, a second set of data chunks corresponding to a difference between the data state at the first time and a second data state of the block device at a second time after the migrating;
    processing, by the second set of hosts, the first set of data chunks and the second set of data to generate the new snapshot corresponding to a full data state of the block device at the second time; and
    storing, by the second set of hosts, the new snapshot.

4. The computer-implemented method of claim 1, wherein the mutation operation level corresponds to a quantity of data transfers from the block device to the first set of hosts.

5. A system, comprising:
    one or more processors;
    memory that stores computer-executable instructions that, if executed by the one or more processors, cause the system to:

determine, for a first cell that represents a set of related data structures, that a resource cost associated with the first cell meets or exceeds a threshold;

associate a first data structure of the set of related data structures with a second cell to reduce the resource cost below the threshold;

generate, by computing resources associated with the second cell, a second data structure outside of the set of related data structures and depending from the first data structure; and process data requests associated with the first data structure and the second data structure using the computing resources associated with the second cell.

6. The system of claim 5, wherein the set of related data structures is represented by the first cell based at least in part on a first range in a hash table maintained by the system.

7. The system of claim 6, wherein the instructions that cause the system to associate the first data structure with the second cell, if executed, further cause the system to select the second cell based at least in part on a second range in the hash table.

8. The system of claim 7, wherein a hash value of an identifier associated with the first data structure is within the second range of the hash table.

9. The system of claim 5, wherein the first data structure represents a block device associated with the system.

10. The system of claim 9, wherein the second data structure represents an initial snapshot taken of the block device.

11. The system of claim 5, wherein the instructions, if executed, further cause the system to:

generate a third data structure based on the second data structure, the third data structure representing an incremental snapshot, relative to the second data structure, of the first data structure; and service requests associated with the third data structure using the computing resources associated with the second cell.

12. The system of claim 5, wherein the instructions that generate the second data structure, if executed, further cause the system to retrieve data corresponding to the first data structure from different computing resources associated with the first cell.

13. A non-transitory computer-readable storage medium having stored thereon executable instructions that, as a result of being executed by one or more processors of a computer system, cause the computer system to:

monitor a first cell that represents a set of related data structures to determine, for the first cell, that a mutation operation rate associated with the set of related data structures meets or exceeds a threshold;

partition the first cell to generate a second cell associated with second computing resources different than first computing resources associated with the first cell;

migrate, based at least in part on the mutation operation rate, a first data structure of the set of related data structure from the first cell to the second cell; and process, using the second computing resources, requests associated with the first data structure and a second data structure depending from the first data structure.

14. The non-transitory computer-readable storage medium of claim 13, wherein the instructions that partition the first cell, as a result of being executed, further cause the computer system to:

determine a first hash value range and a second hash value range using a consistent hashing algorithm; and assign the first hash value range to the first cell and the second hash value range to the second cell.

15. The non-transitory computer-readable storage medium of claim 14, wherein the instructions that migrate the first data structure, as a result of being executed, further cause the computer system to:

generate a hash value of an identifier associated with the first data structure; and as a result of the hash value falling in the second hash value range, assign the first data structure to the second cell.

16. The non-transitory computer-readable storage medium of claim 13, wherein the instructions, as a result of being executed, further cause the computer system to:

receive a request to restore a state of data content of a first block device, the state associated with a third data structure from which the first data structure was generated, the third data structure being associated with the first cell;

obtain, from the different computing resources associated with the first cell, a set of data associated with the third data structure;

generate, based at least in part on the set of data, a second block device;

provide, in response to the request, access to the second block device as a file system; and associate a fourth data structure with the first cell and the second block device.

17. The non-transitory computer-readable storage medium of claim 13, wherein the instructions, as a result of being executed, further cause the computer system to obtain data associated with the first cell using metadata associated with the second cell.

18. The non-transitory computer-readable storage medium of claim 13, wherein the instructions, as a result of being executed, further cause the computer system to generate the second data structure in connection with determining that the first data structure was successfully migrated to the second cell.

19. The non-transitory computer-readable storage medium of claim 13, wherein the mutation operations rate is associated with a rate of data transfer, by the different computing resources, attributable to generating a set of data structures that includes the first data structure.

20. The non-transitory computer-readable storage medium of claim 13, wherein a service implemented by the computer system monitors the first cell to determine the mutation operation rate.

* * * * *